United States Patent
Solmaz (10) Patent No.: US 11,829,446 B2
(45) Date of Patent: Nov. 28, 2023

(54) IMAGE AND VIDEO INSTANCE ASSOCIATION FOR AN E-COMMERCE APPLICATIONS

(71) Applicant: eBay Inc., San Jose, CA (US)

(72) Inventor: Berkan Solmaz, San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 17/522,217

(22) Filed: Nov. 9, 2021

(65) Prior Publication Data

US 2023/0144027 A1    May 11, 2023

(51) Int. Cl.

| | |
|---|---|
| *G06F 3/0481* | (2022.01) |
| *G06F 16/41* | (2019.01) |
| *G06N 20/20* | (2019.01) |
| *G06Q 30/02* | (2023.01) |
| *G06V 20/40* | (2022.01) |
| *G06F 18/22* | (2023.01) |
| *G06F 18/21* | (2023.01) |

(52) U.S. Cl.
CPC ............ *G06F 18/22* (2023.01); *G06F 3/0481* (2013.01); *G06F 16/41* (2019.01); *G06F 18/21* (2023.01); *G06N 20/20* (2019.01); *G06Q 30/02* (2013.01); *G06V 20/49* (2022.01)

(58) Field of Classification Search
CPC .. G06K 9/6215; G06K 9/6217; G06F 3/0481; G06F 16/41; G06F 18/22; G06F 18/21; G06N 20/20; G06Q 30/02; G06V 20/49
See application file for complete search history.

(56) References Cited

U.S. PATENT DOCUMENTS

| | | | |
|---|---|---|---|
| 8,781,231 B1 | 7/2014 | Kumar et al. | |
| 2005/0038814 A1* | 2/2005 | Iyengar | G06F 16/48 |

(Continued)

FOREIGN PATENT DOCUMENTS

| | | |
|---|---|---|
| CN | 116109368 A | 5/2023 |
| EP | 3147817 A1 | 3/2017 |
| EP | 4177846 A1 | 5/2023 |

OTHER PUBLICATIONS

European Office, "European search report," issued in connection with European Patent Application No. 22205463.7 dated Feb. 17, 2023 (10 pages).

(Continued)

*Primary Examiner* — John T Repsher, III
(74) *Attorney, Agent, or Firm* — FIG. 1 Patents (57) ABSTRACT

A process for linking related images and videos is disclosed. The process can include receiving listing information including the images and the video, processing the images using an image processor to determine one or more image descriptors, processing the video using a video processor to determine video descriptors, comparing the image descriptors to the video descriptors, calculating a similarity value for each of the image descriptors in relation to each of the video descriptors, and linking the videos and the images based upon the calculated similarity value. The method can also include causing the display of a user interface including a video linking user interface element operable to cause playback of a relevant portion of the video linked with the displayed image and an image linking user interface element operable to cause display of a relevant image linked with a portion of the video playback.

20 Claims, 5 Drawing Sheets

(56) References Cited

U.S. PATENT DOCUMENTS

| | | | |
|---|---|---|---|
| 2007/0172152 A1* | 7/2007 | Altunbasak | G06T 3/4007 |
| | | | 382/300 |
| 2014/0282743 A1* | 9/2014 | Howard | H04N 21/8583 |
| | | | 725/60 |
| 2015/0106856 A1* | 4/2015 | Rankine | H04N 21/8456 |
| | | | 725/60 |
| 2015/0161147 A1* | 6/2015 | Zhao | G06F 16/7837 |
| | | | 382/190 |
| 2016/0358036 A1* | 12/2016 | Yang | G06F 16/7847 |
| 2019/0268650 A1* | 8/2019 | Avedissian | G06F 3/0481 |
| 2019/0340194 A1 | 11/2019 | Zhao et al. | |
| 2022/0253715 A1* | 8/2022 | Ray | G06N 3/0454 |

OTHER PUBLICATIONS

Umer, S., et al., "Machine learning method for cosmetic product recognition: a visual searching approach", Multimedia Tools and Applications, vol. 80, 2020, pp. 34997-35023.

\* cited by examiner

IMAGE AND VIDEO INSTANCE ASSOCIATION FOR AN E-COMMERCE APPLICATIONS

BACKGROUND

Various applications, such as electronic marketplace applications, are commonly utilized by users to sell and/or buy various items in an electronic marketplace. To list an item for sale, a user generally supplies one or more pictures of the item as well as provides various information for identification of a product that may match the item. In some cases, the user may also upload a video of the item. However, there may be occasions where the video is either irrelevant to the product for sale and/or too long to be easily viewable. In this case, prospective buyers may be presented with the video when viewing the item may be frustrated since the video is irrelevant and/or too long.

It is with respect to these and other general considerations that the aspects disclosed herein have been made. Although relatively specific problems may be discussed, it should be understood that the examples should not be limited to solving the specific problems identified in the background or elsewhere in this disclosure.

SUMMARY

Aspects of the present disclosure relate to a method for linking one or more images and a video on an e-commerce platform. In some cases, the method may include receiving listing information including the one or more images and the video, the one or more images comprising image data and the video comprising video data. In some cases, the method may also include processing the one or more images using an image processor, wherein the image processor determines one or more image descriptors for the one or more images. In some cases, the method may also include processing the video using a video processor, wherein the video processor determines one or more video descriptors for the video. In some cases, the method may also include comparing each of the one or more image descriptors to each of the one or more video descriptors. In some cases, the method may also include calculating a similarity value for each of the one or more image descriptors in relation to each of the one or more video descriptors. In some cases, the method may also include linking the video data and the image data based upon the calculated similarity value. In some cases, the method may also include causing display of a user interface. In some cases, the user interface may include a video linking user interface element associated with a displayed image, where the video linking user interface element is operable to cause playback of a relevant portion of the video, and where the relevant portion being linked with the displayed image. In some cases, the user interface may also include an image linking user interface element associated with the displayed video, where the image linking user interface element is operable to cause display of a relevant image linked with a portion of the video playback.

In further aspects, a system for linking one or more images and a video on an e-commerce platform is provided. The system may include a processor and memory including instructions. In some cases, the instructions are executed by the processor and can causes the processor to perform operations including receive the one or more images and a video where the one or more images comprising image data and the video comprising video data. The operations may also include receive process the image data to determine one or more image descriptors for the one or more images. The operations may also include process the video data to determine one or more video descriptors for the video. The operations may also include compare each of the one or more image descriptors to each of the one or more video descriptors. The operations may also include calculate a similarity value for each of the one or more image descriptors in relation to each of the one or more video descriptors. The operations may also include link the video data and the image data based upon the calculated similarity value. The operations may also include enable display of a video linking user interface element operable to cause playback of a relevant portion of the video linked with one or the one or more images.

In still further aspects, a computer storage medium encoding computer executable instructions are provided that, when executed by at least one processor, may perform a method that includes receiving listing information including the one or more images and the video, the one or more images comprising image data and the video comprising video data. The method may also include processing the one or more images using an image processor, where the image processor determines one or more image descriptors for the one or more images. The method may also include processing the video using a video processor, where the video processor determines one or more video descriptors for the video. The method may also include comparing each of the one or more image descriptors to each of the one or more video descriptors. The method may also include calculating a similarity value for each of the one or more image descriptors in relation to each of the one or more video descriptors. The method may also include linking the video data and the image data based upon the calculated similarity value. The method may also include causing display of a user interface. In some cases the user interface may include a video linking user interface element associated with a displayed image, the video linking user interface element operable to cause playback of a relevant portion of the video, the relevant portion being linked with the displayed image. The user interface may also include an image linking user interface element associated with the displayed video, the image linking user interface element operable to cause display of a relevant image linked with a portion of the video playback.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTIONS OF THE DRAWINGS

Non-limiting and non-exhaustive examples are described with reference to the following figures.

DETAILED DESCRIPTION

Various aspects of the disclosure are described more fully below with reference to the accompanying drawings, which form a part hereof, and which show specific example aspects. However, different aspects of the disclosure may be implemented in many different ways and should not be construed as limited to the aspects set forth herein; rather, these aspects are provided so that this disclosure will be thorough and complete, and will fully convey the scope of the aspects to those skilled in the art. Aspects may be practiced as methods, systems, or devices. Accordingly, aspects may take the form of a hardware implementation, an entirely software implementation or an implementation combining software and hardware aspects. The following detailed description is, therefore, not to be taken in a limiting sense.

In a scenario where a user has uploaded both a video and images of an item for sale on an e-commerce platform, the images and the video are typically viewable by other users (e.g., prospective buyers) when reviewing the item for sale. However, there may be cases where the user has uploaded a video that is partially or wholly unrelated to the item for sale (e.g., generalized marketing materials, promotional materials, brand information, etc.). Furthermore, there may be cases when the uploaded video is too long in duration to be easily viewable by a prospective buyer (e.g., containing redundant information). In this regard, the prospective buyer may become frustrated when viewing the uploaded video since relevant information is not easily derived from the viewing of these videos and/or the video may be longer than required to attain the relevant information. What is needed is a way to easily view the relevant portions of the uploaded video as relating to the specific item for sale.

The present disclosure relates to systems and methods for linking one or more images and a video on an e-commerce platform. In certain aspects, the linking may allow a user to easily view relevant portions of the video in related to or associated with pictures of an item listing on an e-commerce marketplace. In further aspects, the linking may also allow for the viewing of relevant images related to or associated with a particular portion of the video during video playback. In this case, a user (e.g., seller) may upload one or more images and a videos relating to an item. The one or more images and videos contain image data and video data respectively, whereas the image data is processed by an image processor and the video data is processed by a video processor. In this case, the image data and the video data may also contain temporal and/or spatial data, and the temporal and/or spatial data can be processed by the image processor and/or the video processor to generate vectors associated with the image and video data. The vectors associated with the image data and the video data may be descriptors to their associated image and/or portion of the video (e.g., a frame and/or groups of frames, clips, etc.) of the video. The generation of the vectors and/or the assignment of other types of image or video descriptors may be performed using a machine-learning model. The distance between the image vectors and/or descriptors compared to the video vectors and/or descriptors is determined and used to calculate a similarity value between one or more images and one or more portions of the video (e.g., frames, groups of frames, or clips of the video). In some cases, the similarity value may also be determined using a machine-learning model. A machine-learning model employed to determine a similarity value might be the same as the machine-learning model used to generate the vectors or determine the descriptors. Alternatively or additionally, a machine-learning model employed to determine a similarity value might be a different model than the machine-learning model used to generate the vectors or determined descriptors. If a similarity value threshold is met (e.g., the frame/clip vector/descriptor and the image vector/descriptor being close enough in distance to meet, or exceed, the similarity threshold value) the image and the frame/clip of the video may be linked. In some cases, the threshold value may be adjusted based upon a variety of factors including the type of descriptor used, the type of machine algorithm used, and/or the threshold settings. For example, a lower threshold setting may allow for more linkages of less similar descriptors (e.g., allowing greater distances between vectors), while a higher threshold allowing for linkage for highly similar descriptors (e.g., requiring a lower distance between vectors).

When another user (e.g., a buyer) views the item listing on a user interface displayed on a computing device (e.g., a personal computer, smartphone, tablet, etc.) the one or more images and videos associated with the user are displayed. In accordance with aspects of the present disclosure, images that have been linked with portions (e.g., one or more frames/clips) of the video may include an image linking interface element. The image linking interface element is operable to receive input and, in response, to cause the linked (e.g., relevant or associated) portion of the video to begin playing. In certain aspects, the linked portion of the video may begin playing simultaneously as the linked image is being displayed. Additionally, when viewing a video, a video image linking interface element may be displayed in conjunction with a portion of a video (e.g., a frame or a clip) of the video during video playback, which indicates that a relevant image associated with the portion of the video is viewable. In this case, the video image linking interface element is operable to receive input and, in response, cause the linked (e.g., relevant or associated) image to be displayed. The image may be displayed simultaneously with the video playback or, alternatively, the video may be paused upon receiving input by the video image linking interface element. In this regard, it may be easier for a user (e.g., a buyer) to view the relevant portions of the video in relation to the images of the item as well as view relevant images in relation to the portion of the video playback. As such, user frustration and/or wasted time can be avoided when viewing the images and video of an item.

It should be appreciated that although, for exemplary purposes, described aspects generally relate to listing items for sale via an electronic marketplace application, aspects of the present disclosure are not so limited. For example, dynamic product identification assistance techniques described herein may be used to assist users in identifying products that the users may wish to purchase via an electronic marketplace application. In some aspects, dynamic product identification assistance techniques described herein may be used by other applications or in different scenarios other than selling or buying items in an electronic marketplace via electronic marketplace applications.

Figure 1:
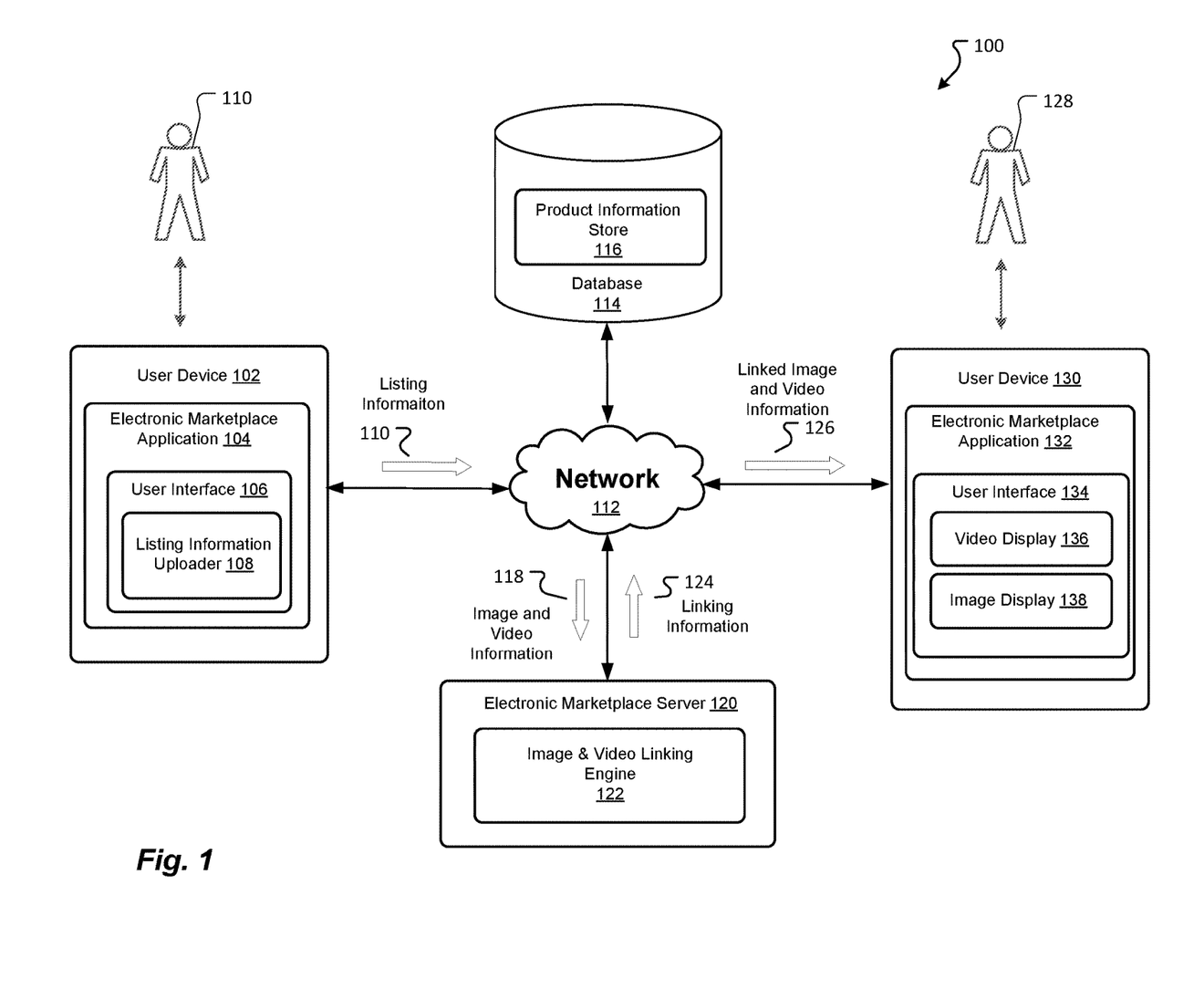
FIG. 1 illustrates an exemplary system for viewing linked video and image information, in accordance with aspects of the present disclosure.

FIG. 1 illustrates an exemplary system 100 for linking one or more uploaded images with portions of uploaded videos associated with a listing for an item, in accordance with aspects of the present disclosure. System 100 may include a user device 102 that may be configured to run or otherwise execute a client application 104. Although only a single user device 102 is illustrated in FIG. 1, in some examples the system 100 may include multiple user devices 102. The one or more user devices 102 may include, but are not limited to, laptops, tablets, smartphones, and the like. Applications 104 that may run or otherwise execute on the one or more user devices 102 may include applications that allow users to engage with an electronic marketplace (sometimes referred to herein as "electronic marketplace applications"), for example, to allow users to post listings to sell items and/or to browse listing to buy items in the electronic marketplace. In some examples, the applications 104 may include web applications, where such applications 104 may run or otherwise execute instructions within web browsers. In some examples, the applications 104 may additionally, or alternatively, include native client applications residing on the user devices 102. The one or more user devices 102 may be communicatively coupled to an electronic marketplace server 120, a database 114, and/or a second user device 130 via a network 112. The network 112 may be a wide area network (WAN) such as the Internet, a local area network (LAN), or any other suitable type of network. The network 112 may be a single network or may be made up of multiple different networks, in some examples.

Electronic marketplace application 104 allows a user 110 to create listings for the sale of an item, for example, on an electronic marketplace. To initiate a listing for an item for sale, the user 110 may enter, or otherwise provide, initial information indicative of the item via a user interface 112 of the electronic marketplace application 134. Specifically, the user 110 may provide text-style information relating to the written description of the item to a listing information uploader 108 of the user interface 106. The user 110 may also choose to upload one or more images (e.g., pictures) and/or a video of the item to the listing information uploader 108. In this case, the information provided by the user 110 (e.g., written information, images, and/or video) may be obtained by user device 102, e.g., via the user interface 106, and may be sent by electronic marketplace application 104 as listing information 110 over network 112. In one example, electronic marketplace application 104 may be an application associated with one or more electronic marketplaces. In other example, electronic marketplace application 104 may be a web browser accessing the electronic marketplace.

System 100 may include a database 114. Database 114 may be communicatively coupled to the electronic marketplace server 120 and/or to the user device 102 via the communication network 112, or may be coupled to the electronic marketplace server 120 and/or to the user device 102 in other suitable manners. The database 114 may receive listing information 110 from electronic marketplace application 104 over network 112. In some cases, database 114 may be a single database or may include multiple databases. For example, database 114 may include product information store 116, which may be a subset of, or partition of, database 114. Product information store 116 may be the portion of database 114 that stores information (e.g., data) relating to items. This information can include, among additional information, the listing information relating to items. In this case, product information store 116 may receive the listing information 110 through the communication of electronic marketplace application 104 and database 114 over network 112, and store the listing information 110 within product information store 116.

System 100 may include electronic marketplace server 120. Electronic marketplace server 120 may be communicatively coupled to database 114 and/or to the user device 102 via the communication network 112. In this case, electronic marketplace server 120 may receive information from either electronic marketplace application 104 and/or database 114, which may include information relating to the listings of items. For example, electronic marketplace server 120 may receive image and video information 118 relating to an item listed on the electronic marketplace over network 112, which may be transmitted from either one of, or both of, electronic marketplace application 104 and database 114.

The received image and video information 118 can include both image data and video data. As a first example, electronic marketplace server 120 may receive the image and video information 118 from database 114. In this case, video and image data transmitted to electronic marketplace server 120 may be based upon data contained in listing information 110 stored in product information store 116. As a second example, electronic marketplace server 120 may receive the image and video information 118 as a direct transmission from electronic marketplace application 104. In this case, the listing information 110 transmitted from electronic marketplace application 104 includes both the image and video data, and electronic marketplace server 120 may receive at least the image and video information 118 of the listing information 110 over network 112.

Electronic marketplace server 120 may include image and video linking engine 122. Image and video linking engine 122 may be used to process the video and image data to link the relevant portions of the user-uploaded video with the user-uploaded images. In this case, and as described previously, user 110 can upload listing information, including one or more images and a video via listing information uploader 108 of user interface 106 to electronic marketplace application 104. In this case, the listing information 110, including image and video information 118, is transmitted over network 112 to either database 114 and/or electronic marketplace server 120, whereas electronic marketplace server 120 receives the image and video information 118.

The image and video information 118 is processed by image and video linking engine 122. As will be described in further detail below with respect FIG. 2, image and video linking engine 122 performs a series of processing and analysis operations to determine the similarity value between each image and each instance of each frame or group of frames (e.g., clips) of the video of the image and video information 118. In examples, the processing and/or analysis may be performed using one or more machine learning algorithms or models. In aspects, when a calculated similarity value is above a minimum threshold value, image and video linking engine 122 links the image and the frame/clip of the video. Electronic marketplace server 120 may then transmit linking information 124, indicating the linking of the images and video frame/clip over network 112. The linking information 120 may be integrated into the image file, the video file, or may be otherwise associated with the listing information for the item associated with the image and video.

For example, in one aspect, linking information 124 may be received by database 114 over network 112, and associated with stored images and video information 118 within product information store 116. In another aspect, the linking information 124 may be associated with the image and video information 118 at electronic marketplace server 120. In either case, the linking information 124 may be used by system 100 to display linked images and videos simultaneously on user device 130.

System 100 may include a second user device 130. Similar to user device 102, second user device 130 may be one or more laptops, tablets, smartphones, and the like, which are configured to run or otherwise execute a client application 132. Similar to user device 102, application 132 may run or otherwise execute applications that allow users to engage with an electronic marketplace, such as allow a user to browse listings to buy items in the electronic marketplace. In some examples, the applications 132 may include web applications, where such applications 132 may run or otherwise execute instructions within web browsers. In some examples, the applications 132 may additionally, or alternatively, include native client applications residing on the second user device 130. User device 130 may be communicatively coupled to either one of, or each of, user device 102, database 114, and/or electronic marketplace server 120 via network 112.

Electronic marketplace application 132 allows a second user 128 to view the listing of an item for sale. When viewing the item for sale, the user interface 134 may display, among other information, video information on video display 136 and image information on image display 138. In the case where the second user 128 views the item that was listed for sale by user 110, the information displayed on user interface 134 may correspond with listing information 110 whereas the video display 136 displays the video uploaded by user 110 and the image display 138 displays the one or more images uploaded by user 110.

As described previously, image and video linking engine 122 may have linked relevant portions (e.g., frames and/or clips) of the video with the images uploaded by user 110, and electronic marketplace server 120 may have transmitted linking information 124, relating to such images and video data, over network 112. In this case, electronic marketplace application 132 may receive linked image and video information 126 over network 112, which can include the linking information 124, image and video information 118, and or listing information 110, from either database 114 and/or electronic marketplace server 120. For example, in the case where electronic marketplace application 132 receives linked image and video data 126 from database 114, linking information 124 may have been associated with the stored listing information in information store 116, and at least the linked image and video information 126 may be sent to electronic marketplace application 132 over network 112. Alternatively, in the case where electronic marketplace application 132 receives linked image and video information 126 from electronic marketplace server 120, linking information 124 may have been associated with the image and video information 118 received by electronic marketplace server 120, and the linked image and video information 126 may be sent to electronic marketplace application 132 over network 112.

In either case, the user interface 134 of electronic marketplace application 132 can display the linked image and video information 126. For example, and as will be described below in further detail relating to user interface 300 of FIG. 3, user interface 134 includes at least two display areas including video display area 136 displaying video data, and image display area 138 displaying image data. In this case, either one of, or both of, the image display area 138 and the video display are 136 may include interactable elements, such as linking interface elements. The interactable elements associated with an image, for example, are operable to receive input and, in response, to initiate playback of linked portions of the video (e.g., as displayed on video display area 136). Similarly, the interactable elements associated with a video are operable to receive input and, in response, to initiate playback of linked images (e.g., as displayed on image display area 138). In these cases, the ability to navigate between relevant portions of the video in relation to images and/or relevant images in relation to the displayed portions of the video allows for user 128 to quickly access relevant information relating to the item for sale, enhancing the user experience on the e-commerce platform.

Figure 2:
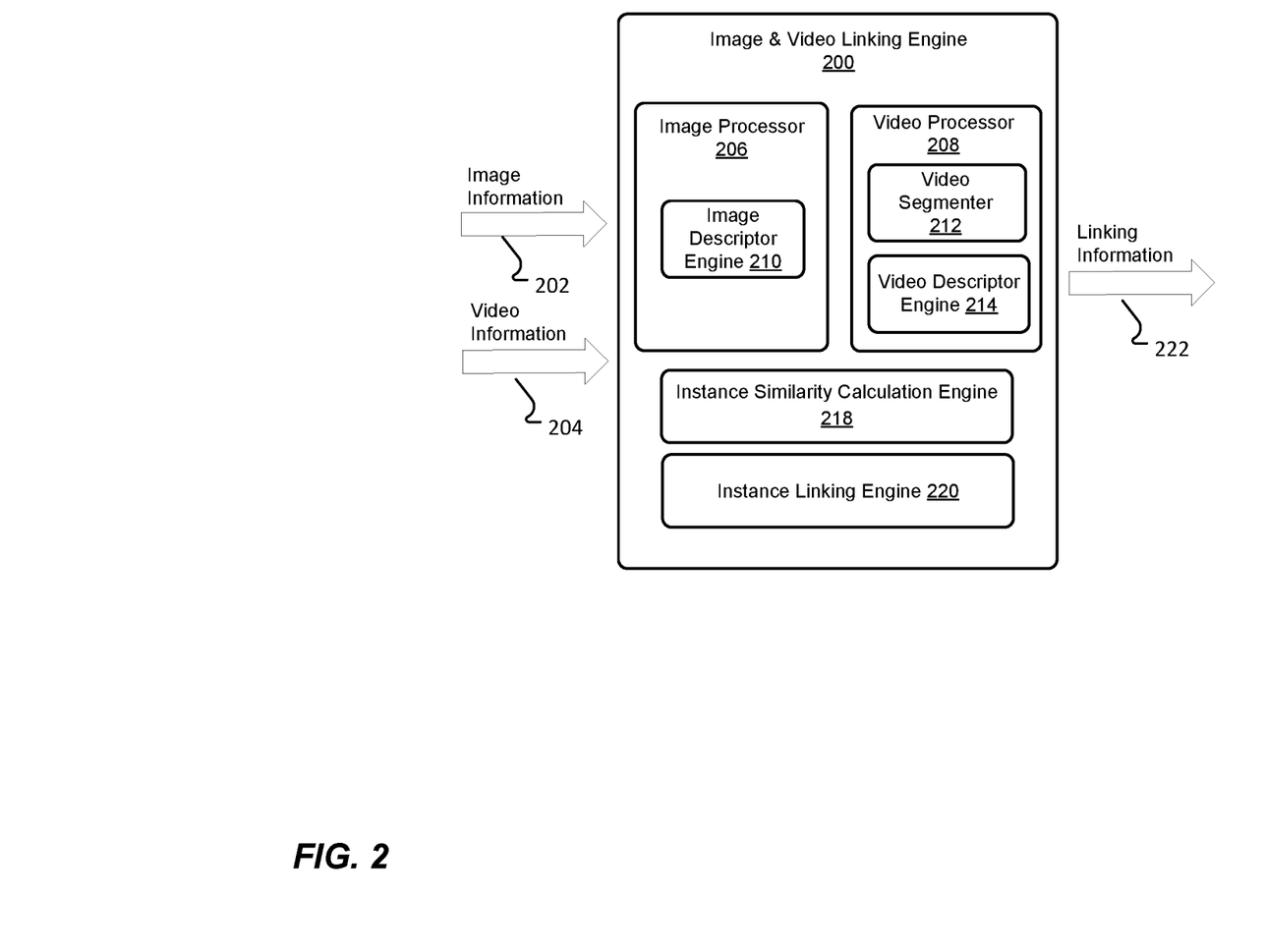
FIG. 2 depicts an example of an image & video linking engine, in accordance with aspects of the present disclosure.

FIG. 2 illustrates an exemplary embodiment of an image and video linking engine 200, in accordance with aspects of the present disclosure. Image and video linking engine 200 may be the same as image and video linking engine 122 as described in relation to system 100 in FIG. 1, and therefore, any description of image and video linking engine 122 is incorporated herein.

Image and video linking engine 200 may receive image information 202 and video information 204. As described in relation to FIG. 1, the image data and video data may be provided via listing uploader 108. The image and video information includes both image data and video data, which corresponds with image information 202 and video information 204 as illustrated in FIG. 2. The image information 202 and video information 204 may be processed by image and video linking engine 200 whereas links are established between images and frames (and/or clips) of the video when the images and the frames/clips of the video meet a minimum similarity threshold value.

Image and video linking engine 200 may include an image processor 206. Image processor 206 may be used to process image information 202. In some case, image processor 206 may be an image processor, however, in other cases, may be any other form of processor capable of determining descriptors relating to the image data. Image processor may include image descriptor engine 210. Image descriptor engine 210 may be used to determine one or more descriptors associated with each instance of an image received in the image information 202. In this case, image information 202 may include, among other data, spatial data that is associated with each image of image information 202. Image descriptor engine 210 may process the spatial data and determine a descriptor for each image. In some cases, the descriptors generated by the image descriptor engine may be in the form of vectors, whereas the vectors are determined based upon one or more machine learning models that process the image information 202. For example, the machine learning algorithms may rely on one or more computer vision techniques and/or deep neural network techniques including, but are not limited to, Scale Invariant Feature Transform (SIFT), Histogram of Oriented Gradients (HOG), GISTvision, Perceptual hash, Residual neural network (E.g., RESNET), siamese networks, multi-model neural networks, two-stream neutral networks, and/or pairwise neural networks. In some cases, these models may be pre-trained, trained with annotated data, or self-trained. In any of these cases, one or more instances of images associated with the listing may be associated with a descriptor that represents the spatial data generated by the image descriptor engine 210 and/or the image processor 206.

Image and video linking engine 200 may include video processor 208. Video processor 208 may be used to process video information 204. In some case, video processor 208 may be a video processor, however, in other cases, may be any other form of processor capable of determining descriptors relating to the video data. Video processor 208 may include video segmenter 212 and video descriptor engine 214. As described previously, descriptors may be determined for each instance of each frame of video information 204. In this case, video segmenter 212 may segment video information 204 into individual frames. Alternatively, descriptors may be assigned to one or more clips of video information 204. In this case, video segmenter 212 may segment video data 204 into one or more clips. For example, video segmenter 212 may segment video information 204 based upon a sliding window of time, whereas the temporal window defines the length of the clip. In this case, when the video information 204 contains a video longer in length than the temporal window, the video information 204 may be divided into multiple clips where each clip has a duration defined by the temporal window. However, in the case where the video information 204 contains a video of a length less than the temporal window, video information 204 may remain unsegmented.

Video processor 208 may include video descriptor engine 214. Video descriptor engine 214 may be used to determine one or more descriptors associated with video information 204. For example, video descriptor engine 214 may determine a descriptor for individual frames of video information 204. Video descriptor engine 214 may alternatively determine one or more descriptors for video information 204 that has been segmented by video segmenter 212 into clips (e.g., a single descriptor for a short duration clip, and two or more descriptors for longer durational videos).

In either of these cases, video information 204 may include, among other data, spatial data and temporal data. Image descriptor engine 210 may process the spatial data, and in some cases, the temporal data, and compute a descriptor for each clip/frame. For instance, in the case where video information 204 has been segmented by video segmenter 212 into clips, the descriptor may be determined based upon the processing of spatial data and temporal data of video information 204. However, in the case where the video information 204 has been segmented into individual instances of frames of the video, the descriptor may be determined based upon the processing of the spatial data of video information 204. In either case, similar to image descriptor engine 210, the descriptors may be in the form of vectors, whereas the vectors are determined based upon one or more machine learning models that process the video information 2024. For example, the machine learning algorithms may rely on one or more computer vision techniques and/or deep neural network techniques including, but are not limited to, Scale Invariant Feature Transform (SIFT), Histogram of Oriented Gradients (HOG), GISTvision, Perceptual hash, Residual neural network (E.g., RESNET), siamese networks, multi-model neural networks, two-stream neutral networks, and/or pairwise neural networks. In some cases, these models may be pre-trained, trained with annotated data, or self-trained. In any of these cases, either the individual instances of frames of video information 204 or clip(s) of video information 204 are associated with a descriptor that represents the spatial or spatial and temporal data processed by video descriptor engine 214.

Image and video linking engine 200 may include instance similarity calculation engine 218. Instance similarity calculation engine 218 may calculate the similarity between instances of an image information 202 compared to instances of a frame or clips of video information 204. As described previously, instances of an image of image information 202 may be associated with a descriptor that represents the spatial data processed by the image descriptor engine 210 of image processor 206. In this case, the descriptors may be feature vectors that are associated with a high-level multi-dimensional space. For example, the feature vectors may be associated 100, 1024, 4096, and/or higher level dimensionality. Also as described previously, each instance of a frame of video information 204 may be associated with a descriptor that represents the spatial data processed by the video descriptor engine 214 of video processor 208. In this case, the descriptors may also be feature vectors that are associated with a high-level multi-dimensional space. In this scenario, instance similarity calculation engine 218 may determine the similarity of the image descriptors and the frame descriptors based upon the distance between an image descriptor vector and a frame or clip descriptor vector. The distance between the descriptors may indicate how similar the frame descriptor is in relation to the image descriptor. For example, there may be an inversely proportional relationship between image descriptor to frame descriptor distance and the similarity value in that when the distance of the image descriptor and the frame descriptor is low, the similarity value is high, and when the distance between the image descriptor and the frame descriptor is high, the similarity value is low. This similarity value can be used to link the similar images and frames with one another on a frame-to-image basis, as will be described further herein relating to instance linking engine 220.

Additionally, in the frame-to-image scenario, since both the frames and video are processed to determine descriptors in the same multi-dimensional space, the method of assigning the descriptors can be the same. For example, in the case where a machine learning network is used to determine descriptors for the images and video frames, the process of determining descriptors for the images and frames can utilize the same machine learning model since the frame descriptor and the image descriptors relate to the same dimensional (e.g., high-level multi-dimensional) space (i.e., they are both images). In this case, the machine learning algorithm or model utilized could have been pre-trained with annotated data, whereas the comparison of the assigned descriptors could be performed without a need to retrain the machine learning model. However, retraining or self-training of the machine model could additionally and/or alternatively be used.

Also as described previously, an instance of a clip of video information 204 may be associated with a descriptor that represents the spatial data processed by the video descriptor engine 214 of video processor 208. In this case, the descriptors may be feature vectors that are associated with a high-level multi-dimensional space. In this scenario, instance similarity calculation engine 218 may determine the similarity of the image descriptors and the video clip descriptors based upon the distance of an image descriptor's vector in relation to a clip descriptor's vector. The distance between the descriptors may indicate how similar the frame descriptor is in relation to the image descriptor. For example, there may be an inversely proportional relationship between image descriptor to clip descriptor distance and the similarity value in that when the distance of the image descriptor and the clip descriptor is low, the similarity value is high, and when the distance between the image descriptor and the clip descriptor is high, the similarity value is low. This similarity value can be used to link the similar images and clips with one another on a clip-to-image basis, as will be described further herein relating to instance linking engine 220.

Figure 3:
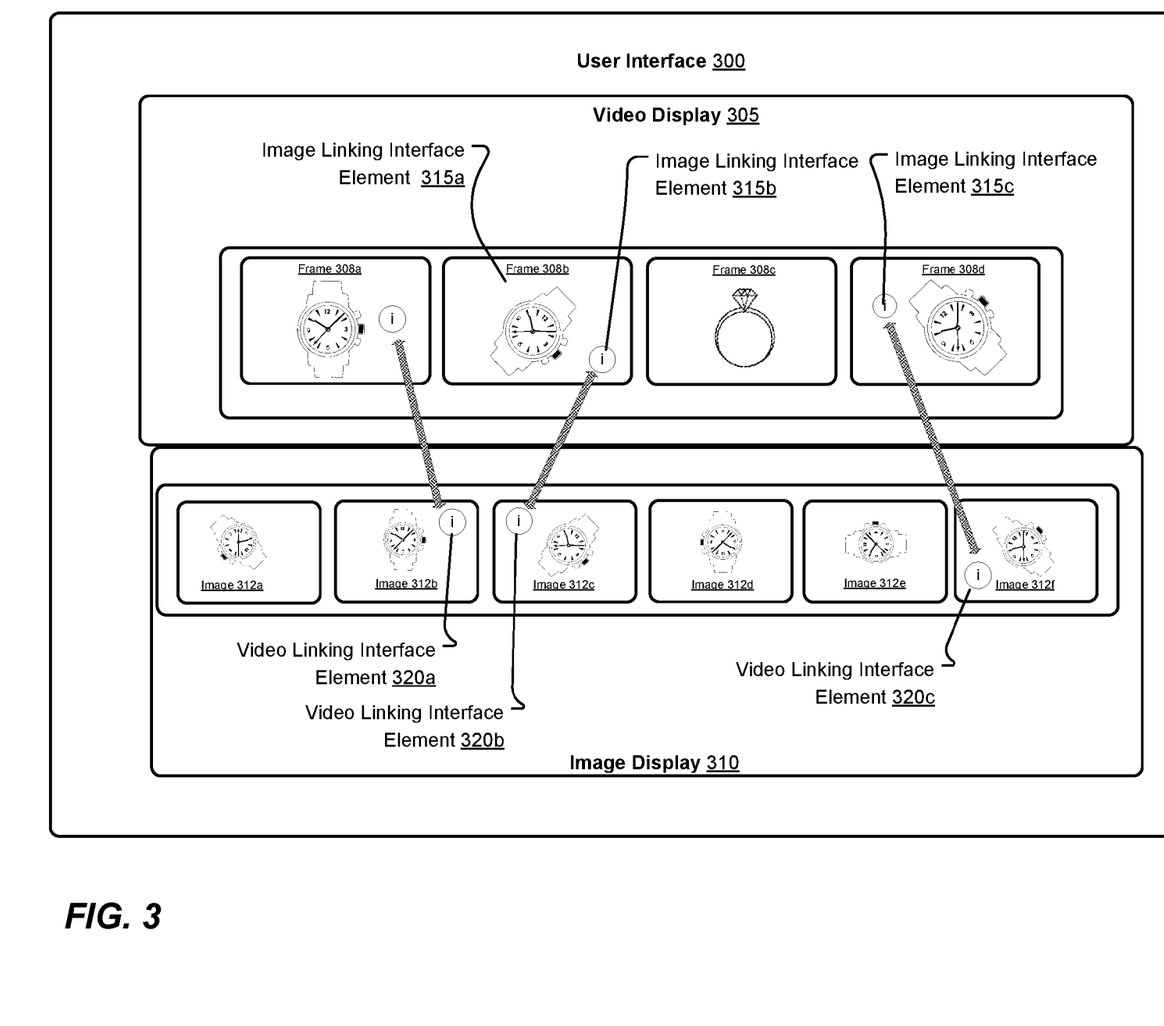
FIG. 3 illustrates an exemplary method for displaying a user interface that includes linked images and videos, in accordance with aspects of the present disclosure.

In this clip-to-image scenario, the clips and video are processed to determine descriptors, which may be based upon two different dimensional spaces, and as such, different methods of assigning the descriptors may be needed. For example, the image descriptor determination may be based upon a first multi-dimensional processing machine learning model, resulting in a first multi-dimensional descriptor (e.g., a first high level multi-dimensional feature vector). However, the video processing model may process additional and/or different data than the image processing model (e.g., video data being different from image data, as well as temporal data associated with the video), whereas the video descriptor is a different multi-dimensional descriptor than the image descriptor. In this case, the use of the two different machine learning algorithms or models may result in descriptors that comprise different dimensionality. In this scenario, it may be necessary to train the instance similarity calculation engine 218 to take into account the two different dimensionalities of the descriptors in order to determine the similarity between a clip and an image. The difference in dimensionality may require the use of a machine learning algorithm that is trained based upon image and video clip processing. For example, the machine learning algorithm may be pre-trained with categories of items including images and videos whereas, when the images and videos are uploaded, a user (e.g., seller, reviewer, etc.) selects a specific category of the item. Alternatively, and as will be described in further detail below relating to user interface 300, the machine learning algorithm may be trained using a feedback look, for example based upon input from a second user (e.g., buyer).

Image and video linking engine 200 may include instance linking engine 220. As described previously, in either the image-to-frame scenario or the clip-to-image scenario, a similarity value is calculated between each instance of an image and each instance of either a frame of the video or a clip of the video. In this case, instance linking engine 220 may link individual images with individual frame/clips of the video that meet a minimum similarity value. For example, in the frame-to-image scenario, instance linking engine 220 may link an image to a frame of the video when the similarity value is above a minimum threshold value. The threshold value may correspond to the distance of the frame descriptor to the image descriptor being below a given distance (e.g., as based upon the inversely proportional relationship of similarity and descriptor distance) Similarly, in the clip-to-image scenario, instance linking engine 220 may link an image to a clip of the video when the similarity value is above a minimum threshold value. Similarly, the threshold value may correspond with the distance of the clip descriptor to the image descriptor being below a given distance (e.g., as based upon the inversely proportional relationship of similarity and descriptor distance). In either of these cases, similar images and video frames/clips are linked when similar enough, and linking information 222 includes annotations indicating which images and video clips/frames are linked. In one example, one or more of the image or video may be modified by the instance linking engine 220 to include a link to the corresponding image or video. Linking information 222 may be used by electronic marketplace application 132 when displaying video display 136 and video display 138 simultaneously, as will be described in detail relating to user interface 300 in FIG. 3.

FIG. 3 illustrates an exemplary embodiment of a user interface 300, in accordance with aspects of the present disclosure. User interface 300 may be the same as user interface 134 as described in relation to system 100 in FIG. 1, and therefore, any description of user interface 134 is incorporated herein.

User interface 300 includes video display 305 and image display 310. Video display 305 may display the video frames 308 (e.g., illustratively 308a, 308b, 308c, and 308d) and image display 310 may display one or more images 312 (e.g., illustratively, images 312a, 321b, 312c, 312d, 312e, 312f, and 312g). Illustratively, image display area 310 is located below video display area 305 about user interface 300, however, the arrangement of video display area 305 and image display area 310 may be in any number of configurations (e.g., side by side, inversely oriented, in the same position, in which case either a video or an image may be displayed at a time, etc.). In any of these cases, a user can view one or more images 312 and one or more videos on user interface 300 simultaneously. For example, a user can view one or more frames 308 of video playing on video display 305 while also viewing one or more images 312 on image display 310. Furthermore, although unillustrated, user interface 300 may include additional features, such as video playback functionality features (e.g., play, pause, fast forward, etc.), image functionality features (e.g., zoom, next image functionality, etc.) and/or other functionality relating to the listing of an item.

As described in relation to image and video linking engine 200 in FIG. 2, images and frames (or clips) of video may be linked by instance linking engine 220, and linking information 222 may be sent to electronic marketplace application 132 of second user device 130. The linking information 222 can comprise information relating to the specific linking of images to a frame or group of frames of the video. In this case, the linked images are displayed as images 312 on image display 310 and the linked video frames are displayed as frames 308 on video display 305. In some cases, interacting with a portion of image 312 may trigger playback of the video beginning at frame 308 and/or interacting with a portion of the frame 308 may trigger display of image 312. In said examples, the portion of the image 312 may include a linking user interface component, such as video linking interface element 320a, operable to cause playback of the video at or near a frame corresponding to the image.

For example, instance linking engine 220 may have determined that frame 308a and image 312b are similar enough to be linked (e.g., the distance between descriptors assigned to image 308a and image 312b being less than a given threshold, the similarity being higher than a given threshold) and sends linking information 222 to electronic marketplace application 132 indicating such linkage. In this case, user interface 300 may display image linking interface element 315a on a portion of frame 308a on video display 305. Additionally, user interface 300 may display video linking interface element 320a on a portion of image 308a on image display 310. Each of image linking interface element 315a and video linking interface element 320a are interactable by the user 128 to trigger the display of image 312b in combination with the playback of the video beginning at frame 308a. For example, in the case where the user interacts with (e.g., clicks, engages, etc.) the video linking interface element 320a of image 312b, the video begins to play at frame 308a on video display 305. Therefore, in this example, the image is interactable to initiate playback of the relevant (e.g., linked) portion of the video. In another example, when the user interacts (e.g., clicks, engages, etc.) the image linking interface element 315a of frame 308a during the playback of the video, image 312b is displayed on image display 310. Therefore, in this example, the video is interactable with by the user to initiate display of the relevant (e.g., linked) image.

When the video linking interface 320 is activated, the frame 308 that is displayed (and the frame that the video subsequently begins to play at) may be, as in the frame-to-image scenario, the frame that instance linking engine 220 linked to image 312 or may be, as in the clip-to-frame scenario, the first frame 308 of the clip that instance linking engine 220 linked to image 312. In either of these cases, when video linking interface 320 is engaged, the frame 308 played may be a frame that is a number of frames offset prior to the linked frame 308 of the video. For example, interaction with the video linking interface 320 may trigger playing of the video at a frame approximate to the linked frame (e.g., 3 seconds) prior to the linked frame 308. In other cases, the frame offset may be greater or less than this amount (e.g., 10 frames, 20 frames, etc.).

The video linking interface elements 320 and the image linking interface elements 315 may be arranged on the images 312 and frames 308 so that video linking interface element 320 and the image linking interface element 315 are easily viewable and engageable by the user. For example, a video linking interface element 320 and the image linking interface element 315 may be placed in a blank portion of frame 308 and/or image 312 respectively, so that the user may easily view and engage the video linking interface 320 and the image linking interface element 315.

Illustratively, frame 308b includes image linking interface element 315b, positioned in the blank space of frame 308b (e.g., in the lower right hand corner of frame 308b) so as to not block the view of the object displayed in frame 308b. Image linking interface element 315c may be positioned in a different location of frame 308d than frame 308a (e.g., the upper left hand corner of frame 308d). In these cases, the background of image 312 and/or frame 308 may contain the video linking interface element 320 and/or image linking interface element 315 whereas the foreground displays the image and video frame. Although unillustrated, video linking interface element 320 and/or image linking interface element 315 can also be displayed on a different portion of image display 310 and/or video display 305, such as near, rather than on, the image 312 and/or video frame 308. For example, video linking interface 320 may be displayed on a playbar near video display 305 or image display 310.

In some cases, multiple images 312 may be linked to the same frames 308 of video. In this case, interaction with the image linking interface 315 may trigger display of multiple images 312 on image display 310 which are linked with frame 308, rather than a single image 312 (e.g., as in a one-to-one linking). Additionally, interacting with the image linking interface element 315 of any of the linked images 312 may trigger display of the same frame 308. Similarly, multiple frames 308 may be linked to the same image 312. In this case, interaction with the image linking interface element 315 on any of the linked frames 308 may trigger display of the same image 312. Additionally, interacting with the video linking interface 320 on the image 312 may trigger display of multiple frames 308, which may correspond with different parts (e.g., different portions, different clips, etc.) of the video playback. In this case, the user can cycle through the different frames 308 to the different parts of the video, such as by engaging video linking element 320 multiple times.

As described in relation to image and linking engine 200, the linking of the images 312 and frames 308 (or clips) of video can be accomplished through the use of machine learning models (e.g., neural networks) that can be either pre-trained or trained using a feedback loop. In some cases, the training of the model may be based upon the interaction of either user 110 and/or user(s) 128 with either the image linking interfaces 315 and/or video linking interfaces 320. For example, the model may be trained by user 110 whereas user 110 is presented with the linked images 312 and frames 308 during an approval process for the listing of the item for sale (e.g., prior to posting the item on electronic marketplace application 132) and determine if the linked images 312 and frames 308 correctly represent the same e-commerce object. In this case, this input from user 110 (e.g., yes or no inputs) may be used to further train the machine learning model and increase the accuracy of the descriptor assignment and/or similarity calculation based upon such model. Additionally, the machine learning model may be trained by user(s) 128 whereas user 128 indicates whether the linked images 312 and frames 308 represent the same item when viewing the listing of the item on user interface 300. In this case, this input from user(s) 128 (e.g., yes or no inputs) may be used to further train the machine learning model and increase the accuracy of the descriptor assignment and/or similarity calculation based upon such model.

Figure 4:
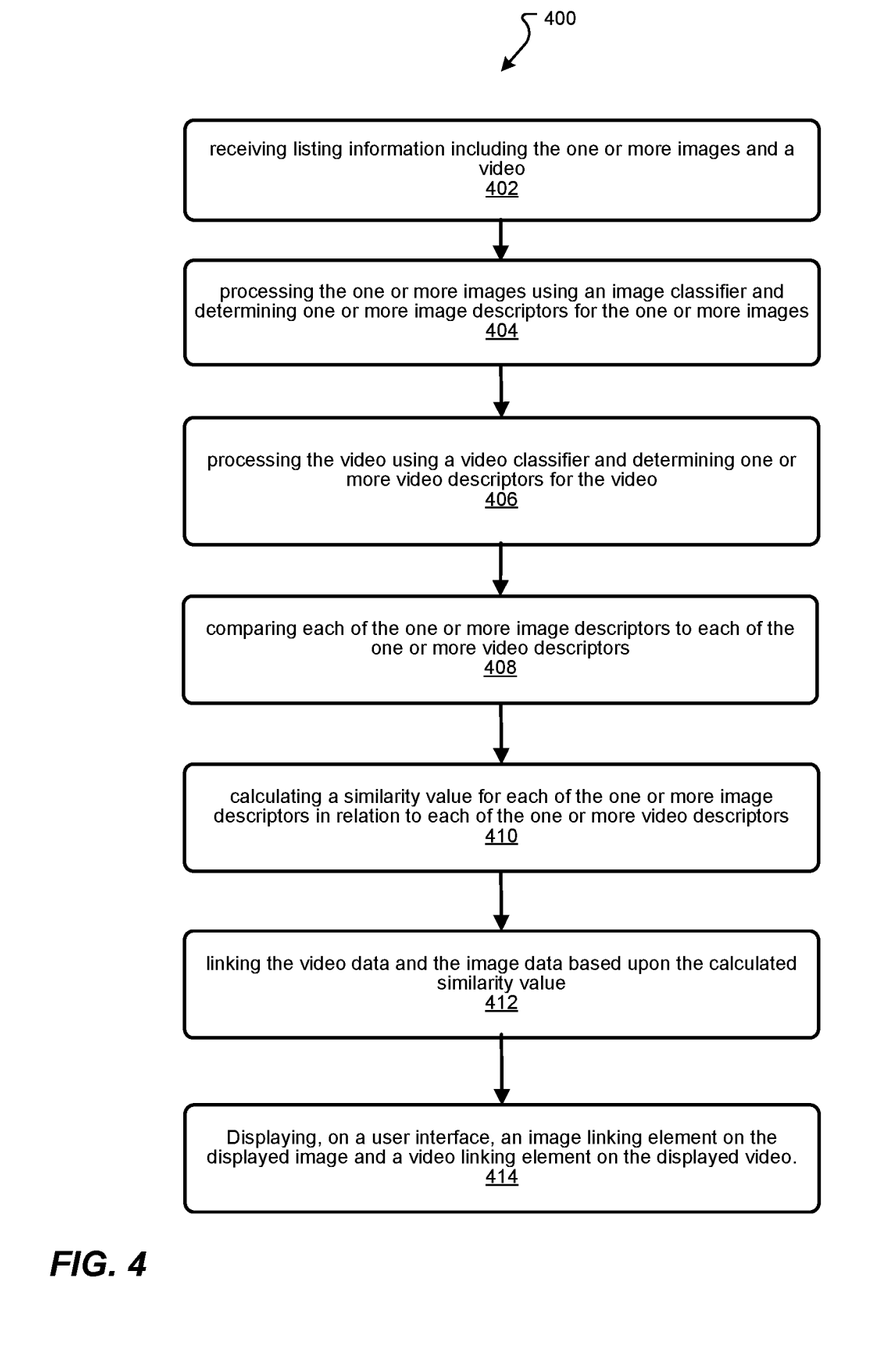
FIG. 4 illustrates an exemplary method for viewing linked video and image information, in accordance with aspects of the present disclosure.

FIG. 4 illustrates an exemplary method 400 for linking one or more images and a video on an e-commerce platform, in accordance with aspects of the present disclosure. A general order of the operations for the method 400 is shown in FIG. 4. The method 400 may include more or fewer steps or may arrange the order of the steps differently than those shown in FIG. 4. The method 400 can be executed as a set of computer-executable instructions executed by a computer system and encoded or stored on a computer readable medium. Further, the method 400 can be performed by gates or circuits associated with a processor, an ASIC, an FPGA, a SOC or other hardware device. Hereinafter, the method 400 shall be explained with reference to the systems, components, devices, modules, software, data structures, data characteristic representations, signaling diagrams, methods, etc., described in conjunction with FIGS. 1, 2, and 3.

Method 400 begins at operation 402 at which listing information is received. In some cases, the listing information includes including the one or more images and one or more videos where the one or more images includes image data and the one or more videos includes video data. Flow continues to operation 404 where processing of the one or more images occurs. In this case, an image processor determines one or more image descriptors for the one or more images. As discussed above, the image processor may include one or more machine learning models that are operable to generate a description vector for the one or more images. Method 400 includes operation 406 at which processing the video occurs. As described above, processing a video may comprises segmenting the video and generating a descriptor for the different segments. In this case, a video processor determines one or more video descriptors for the video. In some embodiments, the image processor determines the one or more image descriptors based upon a first machine learning visual processing algorithm and the video processor determines the one or more video descriptors based upon a second machine learning visual processing algorithm. In some cases, the first machine learning visual processing algorithm and the second machine learning visual processing algorithm may be the same machine learning visual processing algorithm. In further cases, the first machine learning visual processing algorithm determines the one or more image descriptors based upon a first dimensionality and the second machine learning processing algorithm determines the one or more video descriptors based on a second dimensionality, the second dimensionality having a different dimensionality than the first dimensionality.

After generating descriptors for the one or more images and videos, flow continues to operation 408 at which comparing each of the one or more image descriptors to each of the one or more video descriptors occurs. Method 400 also includes operation 410 where calculating a similarity value for each of the one or more image descriptors in relation to each of the one or more video descriptors occurs. In this case, the image data and the video data can include spatial data where the image processor processes the spatial data associated with the one or more images to determine one or more vectors associated with the image data. The one or more image descriptors can be determined based upon the one or more vectors associated with the image data. Additionally, the video processor processes the spatial data associated with the video to determine one or more vectors associated with the video. In this case, the one or more video descriptors can be determined based upon the one or more vectors associated with the video data.

In some embodiments, the similarity value is calculated based upon a distance between the one or more image descriptors and the one or more video descriptors. In further embodiments, the similarity value is based upon an inversely proportional relationship of the distance between the one or more image descriptors and the one or more video descriptors. In still further embodiments, the image processor determines a descriptor for each instance of an image, the video processor determines a descriptor for each instance of a frame of the video, and the similarity value is calculated based upon a comparison of each of the one or more video descriptors in relation to each of the one or more image descriptors. In additional embodiments, the image processor determines a descriptor for each instance of an image, the video processor determines a descriptor for each instance of a group of two or more frames of the video, and the similarity value is calculated based upon a comparison of each of the one or more video descriptors in relation to each of the one or more image descriptors. In this case, the group of two or more frames of the video can be determined based upon a temporal segmentation of the video data. In still further embodiments, the image processor determines a descriptor for each instance of an image, the video processor determines a single descriptor for the video, and the similarity value is calculated based upon a comparison of the single video descriptor in relation to each of the one or more image descriptors. In still further embodiments, the similarity value is calculated based upon a calculated distance between each of the one or more image descriptors in relation to each of the one or more video descriptors.

Method 400 includes operation 412 at which linking of the video data and the image data based upon the calculated similarity value occurs. In some case, the linking of the video data and the image data can be based upon the similarity value being greater than or equal to a threshold value. In further cases, the threshold value is based upon a method of processing the image data and the video data. In some embodiments, the threshold value is adjusted from a first threshold value to a second threshold value based upon the method of processing the image data and the video data.

Method 400 includes operation 414 at which causing display of a user interface occurs. In this case, the user interface includes a video linking user interface element associated with a displayed image. The video linking user interface element is operable to cause playback of a relevant portion of the video where the relevant portion is linked with the displayed image. The user interface includes an image linking user interface associated with the displayed video. The image linking user interface element operable to cause display of a relevant image linked with a portion of the video playback.

Figure 5:
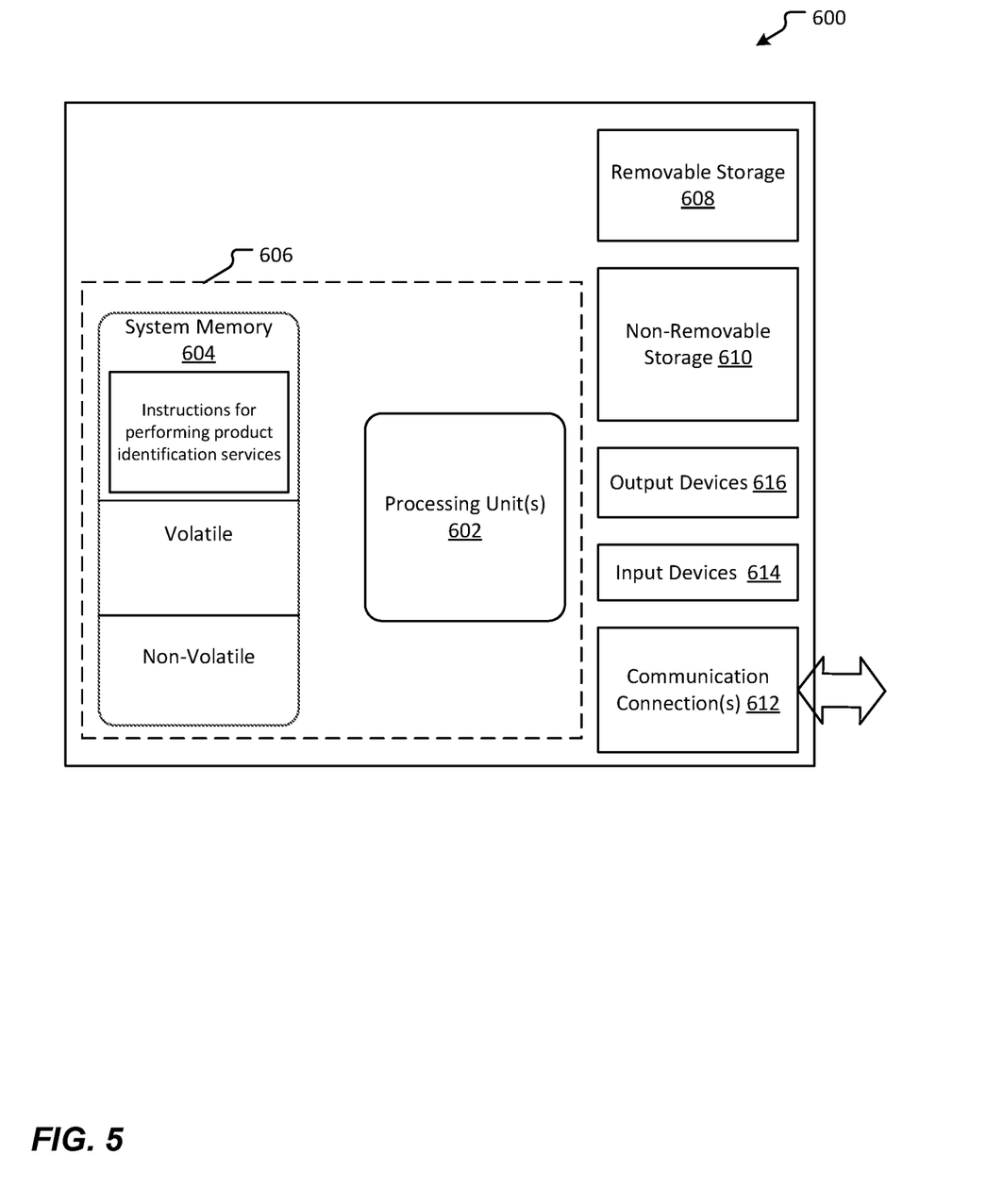
FIG. 5 is a block diagram illustrating example physical components of a computing device with which aspects of the disclosure may be practiced.

FIG. 5 illustrates a simplified block diagram of the device with which aspects of the present disclosure may be practiced in accordance with aspects of the present disclosure. One or more of the present aspects may be implemented in an operating environment 500. This is only one example of a suitable operating environment and is not intended to suggest any limitation as to the scope of use or functionality. Other well-known computing systems, environments, and/or configurations that may be suitable for use include, but are not limited to, personal computers, server computers, handheld or laptop devices, multiprocessor systems, microprocessor-based systems, programmable consumer electronics such as smartphones, network PCs, minicomputers, mainframe computers, distributed computing environments that include any of the above systems or devices, and the like.

In its most basic configuration, the operating environment 500 typically includes at least one processing unit 502 and memory 504. Depending on the exact configuration and type of computing device, memory 504 (instructions for performing product identification services described herein) may be volatile (such as RAM), non-volatile (such as ROM, flash memory, etc.), or some combination of the two. This most basic configuration is illustrated in FIG. 6 by dashed line 506. Further, the operating environment 500 may also include storage devices (removable, 508, and/or non-removable, 510) including, but not limited to, magnetic or optical disks or tape. Similarly, the operating environment 500 may also have input device(s) 514 such as keyboard, mouse, pen, voice input, on-board sensors, touch screens, accelerometers, etc. and/or output device(s) 516 such as a display, speakers, printer, motors, etc. Also included in the environment may be one or more communication connections, 512, such as LAN, WAN, a near-field communications network, point to point, etc.

Operating environment 500 typically includes at least some form of computer readable media. Computer readable media can be any available media that can be accessed by at least one processing unit 502 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, non-transitory medium which can be used to store the desired information. Computer storage media does not include communication media. Computer storage media does not include a carrier wave or other propagated or modulated data signal.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The operating environment 500 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method for linking one or more images and a video on an e-commerce platform, the method comprising:
    receiving listing information including the one or more images and the video, the one or more images comprising image data and the video comprising video data;
    processing the one or more images using an image processor, wherein the image processor determines one or more image descriptors for the one or more images;
    processing the video using a video processor, wherein the video processor determines one or more video descriptors for the video;
    comparing each of the one or more image descriptors to each of the one or more video descriptors;
    calculating a similarity value for each of the one or more image descriptors in relation to each of the one or more video descriptors;
    linking the video data and the image databased upon the calculated similarity value;
    causing display of a user interface, the user interface comprising:
        a video display that is displayed concurrently with an image display;
        a video linking user interface element overlaid on a displayed image at the image display, the displayed image being one of the one or more images, the video linking user interface element operable to cause playback of a relevant portion of the video, the relevant portion being linked with the displayed image based upon the calculated similarity value; and
        an image linking user interface element overlaid on the video at the video display, the image linking user interface element operable to cause display of a relevant image at the image display, the relevant image linked with a portion of the playback of the video based on the calculated similarity value, the relevant image being one of the one or more images; and
    causing display of the relevant image at the image display responsive to reception of a user selection of the image linking user interface element during the playback of the video.

2. The method of claim 1, wherein the listing information is received as a user input comprising the video and the one or more images, the one or more images and the video relating to a same item.

3. The method of claim 1, wherein the image processor determines the one or more image descriptors based upon a first machine learning visual processing algorithm, and the video processor determines the one or more video descriptors based upon a second machine learning visual processing algorithm.

4. The method of claim 3, wherein the first machine learning visual processing algorithm determines the one or more image descriptors based upon a first dimensionality and the second machine learning visual processing algorithm determines the one or more video descriptors based on a second dimensionality, the second dimensionality comprising a different dimensionality than the first dimensionality.

5. The method of claim 3, wherein the first machine learning visual processing algorithm and the second machine learning visual processing algorithm comprise a same machine learning visual processing algorithm.

6. The method of claim 3, wherein:
    the image data and the video data includes spatial data;
    the image processor processes the spatial data associated with the one or more images to determine one or more vectors associated with the image data, the one or more image descriptors determined based upon the one or more vectors associated with the image data; and
    the video processor processes the spatial data associated with the video to determine one or more vectors associated with the video, the one or more video descriptors determined based upon the one or more vectors associated with the video data.

7. The method of claim 6, wherein the similarity value is calculated based upon a distance between the one or more image descriptors and the one or more video descriptors.

8. The method of claim 7, wherein the similarity value is based upon an inversely proportional relationship of the distance between the one or more image descriptors and the one or more video descriptors.

9. The method of claim 1, wherein the image processor determines a descriptor for each instance of an image, the video processor determines a descriptor for each instance of a group of two or more frames of the video, and the similarity value is calculated based upon a comparison of each of the one or more video descriptors in relation to each of the one or more image descriptors.

10. The method of claim 9, wherein the group of two or more
frames of the video is determined based upon a temporal segmentation of the video data.

11. The method of claim 1, wherein the image processor determines a descriptor for each instance of an image, the video processor determines a single descriptor for the video, and the similarity value is calculated based upon a comparison of the single descriptor for the video in relation to each of the one or more image descriptors.

12. The method of claim 1, wherein the similarity value is calculated based upon a calculated distance between each of the one or more image descriptors in relation to each of the one or more video descriptors.

13. The method of claim 1, wherein the linking of the video data and the image data is based upon the similarity value being greater than or equal to a threshold value.

14. The method of claim 13, wherein the threshold value is based upon a method of processing the image data and the video data.

15. The method of claim 13, wherein the threshold value is adjusted from a first threshold value to a second threshold value based upon the method of processing the image data and the video data.

16. A system for linking one or more images and a video on an e-commerce platform comprising:
  a processor; and
  memory including instructions which, when executed by the processor, causes the system to perform operations comprising:
    receive listing information including the one or more images and a video, the one or more images comprising image data and the video comprising video data;
    process the image data, to determine one or more image descriptors for the one or more images;
    process the video data to determine one or more video descriptors for the video;
    compare each of the one or more image descriptors to each of the one or more video descriptors;
    calculate a similarity value for each of the one or more image descriptors in relation to each of the one or more video descriptors;
    link the video data and the image data based upon the calculated similarity value;
    cause display of a user interface, the user interface comprising:
      a video display that is displayed concurrently with an image display;
      a video linking element overlaid on a displayed image at the image display, the displayed image being one of the one or more images, the video linking element operable to cause playback on the video display of the user interface of a relevant portion of the video, the relevant portion of the video linked with one or the one or more images based upon the calculated similarity value,
      an image linking element overlaid on the video at the video display, the image linking element operable to cause display of a relevant image at the image display of the user interface, the relevant image linked with a portion of the playback of the video based upon the calculated similarity value, the relevant image being one of the one or more images; and
      cause display of the relevant image at the image display responsive to reception of a user selection of the image linking element during the playback of the video.

17. The system of claim 16, the operations further comprising:
  determining the one or more image descriptors based upon a first machine learning visual processing algorithm, and
  determining the one or more video descriptors based upon a second machine learning visual processing algorithm.

18. A computer storage medium comprising computer executable instructions that, when executed by at least one processor, cause a system to perform operations comprising:
  receiving listing information including one or more images and a video, the one or more images comprising image data and the video comprising video data;
  processing the one or more images using an image processor, wherein the image processor determines one or more image descriptors for the one or more images;
  processing the video using a video processor, wherein the video processor determines one or more video descriptors for the video;
  comparing each of the one or more image descriptors to each of the one or more video descriptors;
  calculating a similarity value for each of the one or more image descriptors in relation to each of the one or more video descriptors;
  linking the video data and the image data based upon the calculated similarity value;
  causing display of a user interface, the user interface comprising:
    a video display that is displayed concurrently with an image display;
    a video linking user interface element overlaid on a displayed image at the image display, the displayed image being one of the one or more images, the video linking user interface element operable to cause playback of a relevant portion of the video, the relevant portion being linked with the displayed image based upon the calculated similarity value; and
    an image linking user interface element overlaid on the video at the video display, the image linking user interface element operable to cause display of a relevant image at the image display, the relevant image linked with a portion of the playback of the video based on the calculated similarity value, the relevant image being one of the one or more images; and
  causing display of the relevant image at the image display responsive to reception of a user selection of the image linking user interface element during the playback of the video.

19. The method of claim 1, wherein the display of the relevant image responsive to the reception of the user selection of the image linking user interface element is independent of the playback of the video.

20. The method of claim 1, wherein the image display is separate from the video display.

* * * * *